United States Patent [19]

Cocks

[11] Patent Number: 5,120,498
[45] Date of Patent: Jun. 9, 1992

[54] SOLDERS HAVING EXCEPTIONAL ADHESION TO GLASS

[75] Inventor: Josiah C. Cocks, Durham, N.C.

[73] Assignee: C-Innovations, Inc., Research Triangle Park, N.C.

[21] Appl. No.: 700,604

[22] Filed: May 15, 1991

[51] Int. Cl.$^5$ ............................................. H01H 1/00
[52] U.S. Cl. ................................... 420/580; 420/555; 420/558; 420/559; 420/562; 420/564; 420/565
[58] Field of Search .............. 420/555, 558, 559–562, 420/564, 565, 580, 511, 527, 507, 505

[56] References Cited

U.S. PATENT DOCUMENTS

| | | | |
|---|---|---|---|
| 3,103,067 | 9/1963 | Dixon | 420/558 |
| 3,261,721 | 7/1966 | Jenkins | 420/555 |
| 3,627,517 | 12/1971 | Ibscher | 420/555 |
| 3,881,953 | 5/1975 | Turowski et al. | 429/245 |
| 4,344,794 | 8/1982 | Szulczyk et al. | 75/173 C |
| 4,387,073 | 6/1983 | Westbrook | 420/507 |
| 4,525,327 | 6/1985 | Bardin et al. | 420/565 |
| 4,588,657 | 5/1986 | Kujas | 420/558 |
| 4,623,514 | 11/1986 | Arora et al. | 420/555 |
| 4,797,328 | 1/1989 | Boehm et al. | 428/621 |
| 4,810,308 | 3/1989 | Eagar et al. | 148/158 |
| 4,917,861 | 4/1990 | Schaffer et al. | 420/463 |

FOREIGN PATENT DOCUMENTS

| | | | |
|---|---|---|---|
| 0030921 | 3/1978 | Japan | 420/505 |
| 0026628 | 2/1985 | Japan | 420/505 |

OTHER PUBLICATIONS

Binary Alloy Phase Diagrams, (eds) Massalski ASM, 1986, pp. 1377, 1670, 1504, 1378.

*Primary Examiner*—Upendra Roy

[57] ABSTRACT

Heavy metal solders having exceptional ability to wet non-metals, especially glass, are produced by the incorporation of small amounts of the light reactive metals lithium, sodium, potassium, rubidium, cesium, calcium, or magnesium into the heavy metal solder compositions. These heavy metal solder compositions consist essentially of alloys contained within the heavy metal system Pb-Sn-In-Bi-Cd-Sb-Hg-Ga-Ag-Au or within subsystems thereof wherein each heavy metal element present in the system or subsystem can potentially constitute nearly the whole of the total depending upon the specific composition chosen. In cases where a low melting point is desired the resultant solder will in general have the formula:

$$A_a B_b$$

wherein A is at least three metals selected from the group consisting of

Pb, Sn, In, Bi, Cd, Sb, Hg, Ga, Ag, and Au;

and B is at least one metal selected from the group consisting of

Li, Na, K, Rb, Cs, and Ca, and Mg; and wherein
b ranges from about 0.0001 to about 0.1; and
a ranges from about 0.9999 to about 0.9.

20 Claims, No Drawings

SOLDERS HAVING EXCEPTIONAL ADHESION TO GLASS

Many different solder compositions are known which lie within the heavy metal system containing the heavy elements lead-tin-indium-bismuth-cadmium-antimony-mercury-gallium-silver-gold. Of these, only indium-tin alloys have any significant capacity to wet and to adhere to glass. In the present invention a method has been discovered to enable all of the alloys contained within this ten component system or subsystems thereof, including the individual elements taken separately, to wet and to adhere to glass, as well as to improve the ability of indium-tin solders to wet and to adhere to glass. The heavy metal compositions of the final solder may range from essentially 0.01 weight percent to essentially 99.99 weight percent of each of the heavy metal elements present depending upon the particular composition chosen except that if they simultaneously contain substantially essentially only lithium, calcium, tin, and lead as other than impurities, then the solder composition contains a minimum of 0.08 weight percent of lithium, a minimum of 3 weight percent of tin, a minimum of 0.16 weight percent of calcium and a maximum of 96.76 percent of lead.

OBJECTS OF THE INVENTION

It is and object of the invention to produce solders of the type containing indium and tin which have a greatly improved ability to wet and adhere to glass.

It is another object of the invention to enable binary alloy solders based on lead and tin to wet and to adhere to glass.

It is still another object of the invention to produce ternary alloy solders which contain indium, tin and lead to wet and to adhere to glass.

An additional object of the invention is to produce heavy metal solders having increased strength, as well as increased ability to wet and adhere to glass.

It is yet another object of the invention to enable all alloys contained within the multicomponent system Pb-Sn-In-Bi-Cd-Sb-Hg-Ga-Ag system or subsystems thereof including these elements taken separately to wet and to adhere to glass.

It is still another object of the invention to enable Wood's metal and Newton's metal and and modifications thereof to wet and to adhere to glass.

BACKGROUND OF THE INVENTION

A very large number of solder compositions are known. In particular, solders containing lead and tin or containing indium and tin have long been in common usage. Most solders comprise mixtures of heavy metals such as lead, indium, and tin. Other heavy metals such as bismuth, antimony, gold, silver, cadmium, zinc, gallium mercury, copper, and nickel may also be found in some solder compositions.

Boehm, et al. in U.S. Pat. No. 4,797,328 disclose a soft solder alloy for connecting ceramic parts which soft solder comprises 86 to 99% lead or tin, 0 to 13% silver and/or copper, 0 to 10% indium, and 1 to 10% titanium and/or zirconium.

Szulczyk, et al., in U.S. Pat. No. 4,344,794, disclose a solder for non-noble metal containing silver contacts, which solder consists of a silver-copper alloy with cadmium and/or tin and/or indium.

Lithium has been used as a grain-refining element in some non-solder alloys. Schaffer, et al., in U.S. Pat. No. 4,917,861 teach the use of lithium in palladium dental restoration alloys for this grain-refining purpose.

Eagar, et al., in U.S. Pat. No. 4,810,308 teach the use of lithium together with silver and copper and either tin or antimony as well as other elements to make a hardenable silver alloy.

Turowski, in U.S. Pat. No. 3,881,953 teaches the use of lead, calcium, lithium, tin alloys as battery electrode grids, said alloys consisting essentially of about 0.05-0.07 percent lithium, 0.005-0.15 percent calcium, 0.1-2 percent tin, by weight and the balance lead.

None of these patents, however, discloses the use of the reactive light metal elements lithium, sodium, potassium, rubidium, cesium, calcium, and magnesium or the alloys magnesium-lithium, and calcium-lithium to improve the properties of solders, especially the ability of the heavy metal solder to wet and to adhere hermetically to glass.

DESCRIPTION OF THE INVENTION

Lithium, sodium, potassium, rubidium and cesium are not normally thought of as being soluble in any normal solder compositions. These elements are extremely light and electrochemically reactive, and are able to displace hydrogen from water. Magnesium and calcium, due also to their great electrochemical activity, are also not considered soluble in heavy metal solders. This is so because the difference in Pauling electronegitivity of the reactive light metals lithium, sodium, potassium, rubidium, cesium, calcium, and magnesium and the less reactive heavy metals lead, tin, indium, bismuth, cadmium, antimony, mercury, gallium, gold, silver, copper, and nickel tends to result in the easy formation of intermetallic compounds. However, some slight solubility of magnesium, calcium, lithium, sodium, potassium, rubidium and cesium in heavy metal solders appears to be still possible. Unexpectedly, we have discovered that this small solubility produces significant effects related to the ability of these solders, elements, and alloys to wet both metals and non-metals, especially glass. The higher the reactivity of the light metal, the greater is found to be its ability to enable the solder to adhere to glass. Thus, lithium is more effective than either magnesium or calcium which, while being electrochemically active, are less so than is lithium.

In industry, so-called glass solders are, with the exception of indium-tin alloys, actually low melting point glass frits that are composed of low melting point oxide mixtures. A low melting point metallic solder for glass will have wide applicability provided it can be made to easily wet and adhere to the glass because the generally ductile nature of metals allows a much wider mismatch in thermal expansion coefficient than is possible with low melting point glasses that are used as so-called glass solders. Indium-tin alloys themselves are not widely used because of the very great difficulty of getting them to wet and to adhere to glass. The present invention not only overcomes this difficulty but also enables a vast number of solder compositions to wet and to adhere to glass.

PREFERRED EMBODIMENTS OF THE INVENTION

A first preferred embodiment consists essentially of an alloy containing between 5 to 95 weight percent indium, together with between 95 to 5 weight percent tin to which is added from 0.01 to 3 weight percent lithium. An especially preferred composition consists essentially of 48 weight percent tin, and 51.3 percent indium, and 0.7 weight percent lithium. This alloy is found to have much better ability to wet and to adhere to glass and other similar non-metallic substances then does a similar tin-indium alloy which does not contain lithium. It is found for example that this indium-tin alloy containing approximately 0.7 weight percent lithium will wet and adhere to window glass which has not been cleaned in any special way but has instead been soldered simply in the as-received condition. Plain indium-tin alloys can be made to adhere to glass but only if the glass has been subjected to an scrupulous cleaning procedure. The alloy disclosed here does not require any such cleaning procedure.

In the second preferred embodiment, approximately 0.5 weight percent lithium is added to a lead-tin alloy originally comprising substantially 60 weight percent tin and 40 weight percent lead. It has been surprisingly found that this alloy will wet and adhere to window glass. Lead-tin alloys that do not contain lithium do not adhere to window glass even if the window glass is extensively and thoroughly cleaned before soldering is attempted. A similar beneficial effect of lithium additions are found in lead-tin alloys containing as little as 5 weight percent tin or as much as 95 weight percent tin.

In a third preferred embodiment both magnesium and lithium are added to an indium-tin solder alloy. A preferred range is from 35 to 65 weight percent tin. It is found that this addition of lithium and magnesium may be made by adding the lithium and the magnesium as a lithium-magnesium alloy, said alloy containing from 1 to 70 weight percent lithium and from 99 to 30 weight percent magnesium. A preferred composition is essentially 30 weight percent of lithium and 70 weight percent magnesium. In this case magnesium produces a precipitate which is not very soluble in the indium-tin base solder. However, the resulting precipitate strengthened solder is harder than a similar solder which does not contain magnesium, yet retains an exceptional ability to wet and adhere to glass. By combining the lithium with the magnesium and by using this magnesium-lithium alloy as the substance added to the indium-tin solder alloy, it is found that the danger of fire during the addition process is greatly reduced. Similar beneficial effects may be obtained by using calcium-lithium alloys, said calcium-lithium alloys containing from 1 to 70 weight percent lithium and from 99 to 30 weight percent calcium. A preferred composition is 25 weight percent lithium and 75 weight percent calcium. A preferred total range for either calcium-lithium or for magnesium-lithium additions is from 0.01 to 10 weight percent.

In a fourth preferred embodiment both magnesium and lithium are added to lead-tin solder alloy. A preferred range is from 35 to 85 weight percent tin. It is found that this addition of lithium and magnesium may be made by adding the lithium and the magnesium as a lithium-magnesium alloy, said alloy containing from 1 to 70 weight percent lithium and from 99 to 30 weight percent magnesium. A preferred composition is essentially 30 weight percent of lithium and 70 weight percent magnesium. In this case magnesium produces a precipitate which is not very soluble in the indium-tin base solder. However, the resulting precipitate strengthened solder is harder than a similar solder which does not contain magnesium, yet retains an exceptional ability to wet and adhere to glass. By combining the lithium with the magnesium and by using this magnesium-lithium alloy as the substance added to the lead-tin solder alloy, it is found that the danger of fire during the addition process is greatly reduced. Similar beneficial effects may be obtained by using calcium-lithium alloys, said calcium-lithium alloys containing from 1 to 70 weight percent lithium and from 99 to 30 weight percent calcium. A preferred composition is 25 weight percent lithium and 75 weight percent calcium. A preferred total range for either calcium-lithium or for magnesium-lithium additions is from 0.01 to 10 weight percent.

A fifth preferred embodiment comprises an alloy containing between 5 to 95 weight percent indium, together with between 95 to 5 weight percent tin and to which is added from 0.1 to 3 weight percent sodium. An especially preferred composition comprises substantially 48 weight percent tin, and 51 percent indium, and 1 weight percent sodium. This alloy is found to have much better ability to wet and to adhere to cleaned glass and other similar substances then does a similar tin-indium alloy that does not contain sodium. In some cases up to 10 weight percent sodium may beneficially be added.

In a sixth preferred embodiment, approximately 1.5 weight percent sodium is added to a lead-tin alloy originally comprising substantially 60 weight percent tin and 40 weight percent lead. It has been surprisingly found that this alloy will wet and adhere to cleaned glass. Lead-tin alloys that do not contain sodium do not adhere to glass even if the window glass is extensively and thoroughly cleaned before soldering is attempted. A similar beneficial effect of sodium additions is found in lead-tin alloys containing as little as 10 weight percent tin or as much as 90 weight percent tin. Indeed, the addition of lithium to lead, to tin or to indium enables all of these metals to wet and to adhere to glass.

A very large number of solder compositions within the lead-tin-indium heavy metal ternary system are possible. If no lead is added and therefore any lead present is only present as essentially an impurity, then the remaining tin and indium constitute essentially a binary system. Similarly, if no indium is added and any indium present essentially only as an impurity then the remaining lead and tin constitute a binary system, as would lead and indium if no tin were added. In the general alloy case, the range of compositions preferably includes from 0 to 95 percent lead, from 0 to 95 weight percent of tin, and from 0 to 95 weight percent of indium. All of these alloys will show improved ability to wet glass if they contain small amounts of lithium, sodium, potassium, cesium, magnesium, and calcium.

It is thus found in the present case that the dissolved reactive light metal addition can be selected from the group comprising lithium, sodium, potassium, rubidium, cesium, magnesium, or calcium and that one or more of these active elements can be added with beneficial effects to the heavy metal solder composition, wherein the said heavy metal solder composition comprises from 0 to 95 weight percent of lead, from 0 to 95 weight percent of tin and from 0 to 95 weight percent of indium. For such alloys, of course the total weight percent of indium, lead, and tin must total to essentially 100 percent, before the addition of the active element or elements. Based on the total solder weight, composed of heavy metals the weight percent of reactive elements is preferably from 0.01 up to 3 weight percent but can go up to 10 weight percent. Specific ranges for useful additions of reactive metals can also be from 0.1 to 1 weight percent. Similar beneficial effects are found for the individual three binary alloy systems which comprise the ternary lead-tin-indium system as well as in the ternary system itself.

If one considers higher order systems that contain four, or five, or more elements such as lead, tin, indium, bismuth, and cadmiun then a large number of low melting point alloys can be produced, including those whose melting points are less than 250 degrees centigrade. Most of these alloys are not used as solders, either for reasons of cost or for reasons of their lack of reactivity such that effective soldering is not possible. Such low melting point alloys are also termed fusible metals or fusible alloys. By the addition of small amounts of lithium, sodium, potassium, rubidium, cesium magnesium, and calcium to these alloys, their metallurgical reactivity will be increased such that their use as solders is made much easier and much more effective, particularly with respect to the soldering of glass but also with respect to soldering other metals, such as copper.

A very large number of heavy metal solder compositions are possible within the heavy metal multicomponent systems which can be produced using the heavy metals which are used in known heavy metal solders, including lead, tin, indium, bismuth, cadmium, antimony, mercury, gallium, silver and gold. The adhesion of all such solders to glass will be improved by the addition of small quantities, from 0.01 to 3 weight percent but also in some cases up to 10 weight percent of at least one reactive metal element selected from the group consisting of lithium, sodium, potassium, cesium calcium, and magnesium. To be most useful as a solder for glass heavy metal solder should preferably have a melting point which is 250 degrees centigrade of less in order that the glass need not be preheated before soldering in order to avoid cracking during the soldering operation.

In an eighth preferred embodiment 0.05 weight percent of lithium is added to an alloy originally comprising essentially 50 parts by weight of bismuth, 25 parts of lead, 12.5 parts of tin, and 12.5 parts of cadmium. This base alloy has long been known and is sometimes termed Wood's metal. Wood's metal by itself cannot be used to solder glass because if does not wet or adhere to glass. It has now been discovered that the addition of one or more elements selected from the list consisting of lithium, sodium, potassium, cesium, magnesium, and calcium will enable Wood's metal to wet glass. A preferred addition is that of 0.5 weight percent of lithium, which enables the Wood's metal to wet and to adhere hermetically to common window glass, however, beneficial effects are found for reactive metal additions of from 0.001 to 10 weight percent. The specific composition of the Wood's metal can also be changed if a higher melting metal is desired yet still retain the beneficial effect of the reactive light metal addition. For example, alloys consisting essentially of from 40 to 60 parts of bismuth, 20 to 30 parts of lead 10 to 15 parts of cadmium and 10 to 15 parts of tin can be substituted for the original Wood's metal composition yet still show the beneficial effect of the reactive metal addition as observed in the original Wood's metal composition.

In a ninth preferred embodiment 0.05 weight percent of lithium is added to an alloy originally comprising essentially 50 parts by weight of bismuth, 31.25 parts of lead, 18.75 parts of tin. This base alloy has long been known and is sometimes termed Newton's metal. Newton's metal by itself cannot be used to solder glass because if does not wet or adhere to glass. It has now been discovered that the addition of at least one element selected from the list consisting of lithium, sodium, potassium, cesium, magnesium, and calcium will enable Newton's metal to wet glass. A preferred addition is that of 0.5 percent of lithium, which enables the Newton's metal to wet and to adhere hermetically to common window glass. The specific composition of the Newton's metal can also be changed if a higher melting metal is desired yet still retain the beneficial effect of the reactive light metal addition. For example, alloys consisting essentially of from 40 to 60 parts of bismuth, 25 to 40 parts of lead and 3 to 25 parts of tin can be substituted for the original Newton's metal composition yet still show the beneficial effect of the reactive metal addition as observed in the original Newton's metal composition.

In the case of low melting point solders with melting points of less than 250 degrees centigrade the resultant solders produced in accordance with the present invention can in general be represented closely by the formula:

$$A_a B_b$$

wherein A is at least three metals selected from the group consisting of

Pb, Sn, In, Bi, Cd, Sb, Hg, Ga, Ag, and Au;

and B is at least one metal selected from the group consisting of

Li, Na, K, Rb, Cs, Ca, and Mg; and wherein
a ranges from about 0.0001 to about 0.1; and
b ranges from about 0.9999 to about 0.9.

The metallic solder may be composed essentially of heavy metal elements and light reactive metal elements in which the said heavy metal elements are selected from the list consisting of lead, tin, indium, bismuth, and cadmium and the said light reactive metal elements are selected from the list consisting of lithium, sodium, and potassium, said light reactive metal elements being from 0.01 to 10 weight percent of the total metallic solder weight and wherein the said heavy metals can each range from 0.01 to 99.99 weight percent of the final alloy such that the amount of lead, tin, indium, bismuth, cadmium, lithium, sodium, and potassium which are present total to essentially 100 percent, except that if the solder simultaneously contains substantially essentially only lithium, calcium, tin, and lead as other than impurities, then the solder composition contains a minimum of 0.08 weight percent of lithium, a minimum of 3 weight percent of tin, a minimum of 0.16 weight percent of calcium and a maximum of 96.76 weight percent of lead.

I claim:

1. An improved solder consisting essentially of heavy metals, said heavy metals consisting essentially of at least two heavy elements wherein the said heavy elements are selected from the group consisting of lead, tin, indium, cadmium, bismuth, mercury, antimony and gallium, wherein the improvement comprises the addition of from 0.01 to 10 weight percent of reactive metals selected from the group consisting of lithium, sodium, potassium and cesium.

2. An improved solder as disclosed in claim 1, wherein the said heavy elements are selected from the group consisting of lead, tin, indium, cadium, and bismuth.

3. An improved solder as disclosed in claim 1, wherein the said heavy elements are selected from the group consisting of lead, tin, and indium.

4. An improved solder of the type disclosed in claim 1, wherein the said heavy elements are lead and tin.

5. An improved solder as disclosed in claim 1, wherein the said heavy elements are tin and indium.

6. An improved solder as disclosed in claim 1, wherein the said reactive metals are selected from the group consisting of potassium and cesium.

7. An improved solder wherein the said solder is essentially a Wood's metal alloy consisting essentially of from 40 to 60 parts of bismuth, 20 to 30 parts of lead, 11 to 15 parts of tin, and 10 to 15 parts of cadmium, wherein the improvement consists essentially of the addition of from 0.01 to 10 weight percent of elements selected from the list consisting of lithium, sodium, potassium, rubidium and cesium.

8. An improved heavy metal solder as disclosed in claim 7 where the improvement consists of the addition of from 0.01 to 10 weight percent of elements selected from the list consisting of lithium, sodium, and potassium.

9. An improved heavy metal solder as disclosed in claim 7 wherein the improvement consists of the addition of from 0.01 to 10 weight percent of elements selected from the list consisting of rubidium and cesium.

10. An improved heavy metal solder wherein the said heavy metal solder consists essentially of a Newton's metal alloy consisting essentially of from 40 to 60 parts of bismuth, 25 to 40 parts of lead, 3 to 25 parts of tin, wherein the improvement consists essentially of the addition of from 0.01 to 10 weight percent of elements selected from the list consisting of lithium, sodium, potassium, rubidium and cesium.

11. An improved heavy metal solder as disclosed in claim 10 wherein the improvement consists of the addition of from 0.01 to 10 weight percent of at least one element selected from the list consisting of lithium, sodium, and potassium.

12. An improved heavy metal solder as disclosed in claim 11 wherein the improvement consists of the addition of from 0.01 to 10 wieght percent of at least one element selected from the list consisting of rubidium and cesium.

13. An improved lead-tin solder consisting essentially of from 5 to 95 weight percent lead the balance being essentially tin and wherein the improvement consists of the addition to the said lead-tin solder of 0.01 to 10 weight percent of calcium and lithium said calcium and lithium being added to the said tin-lead solder as a calcium-lithium alloy, said calcium-lithium alloy consisting essentially of from 1 to 70 weight percent lithium, together with from 99 to 30 weight percent calcium.

14. An improved lead tin-solder consisting essentially of 30 to 50 weight percent of lead and from 50 to 70 weight percent of tin wherein the improvement consists essentially of the addition of 0.01 to 3 weight percent of magnesium and lithium, the said magnesium and lithium being added to the said lead-tin solder as a magnesium-lithium alloy, said magnesium-lithium alloy consisting essentially of from 1 to 70 weight percent of lithium together with from 99 to 30 weight percent magnesium.

15. An improved solder consisting essentially from 20 to 60 weight percent indium and from 30 to 70 weight percent tin, wherein the improvement comprises the addition of between 0.01 to 10 weight percent of at least one reactive light element selected from the group comprising lithium, sodium, potassium, rubidium, and cesium.

16. An improved indium-tin solder consisting essentially to 35 to 65 weight percent tin and 65 to 35 weight percent indium wherein the improvement consists of the addition to the said indium-tin solder of 0.01 to 10 weight percent of calcium and lithium said calcium and lithium being added to the said indium-tin solder as a calcium-lithium alloy, said calcium-lithium alloy consisting essentially from 1 to 70 weight percent lithium together with from 99 to 30 weight percent calcium.

17. An improved tin-indium solder consisting essentially 35 to 65 weight percent tin and 65 to 35 weight percent indium wherein the improvement consists of the addition to the said indium-tin solder of 0.01 to 10 weight percent of magnesium and lithium said magnesium and lithium being added to the said indium-lead solder as a magnesium-lithium alloy, said magnesium-lithium alloy comprising essentially from 1 to 70 weight percent lithium together with from 99 to 30 weight percent magnesium.

18. A solder for glass, said solder having essentially the formula:

$$A_a B_b$$

wherein A is a metal consisting essentially of at least three elements selected from the group consisting of Pb, Sn, In, Bi, Cd, Sb, Hg, and Ga and B is at least one element selected from the group consisting of Li, Na, K, Rb, and Cs, and wherein b ranges from about 0.0001 to about 0.1 and a ranges from about 0.9999 to about 0.9.

19. A solder for glass as described in claim 18 wherein the said solder has a melting point of less than 250 degrees centigrade.

20. A solder for glass as described in claim 18 wherein A is a metal consisting essentially of at least three elements selected from the group consisting of Pb, Sn, In, Bi, and Cd and B is at least one element selected from the group consiting of Li, Na, and K wherein b ranges from about 0.0001 to about 0.1 and a ranges from about 0.9999 to about 0.9.

* * * * *